Jan. 16, 1923.

C. A. PARSONS ET AL.
ELASTIC DRIVE.
FILED MAY 18, 1922.

INVENTORS
CHARLES A. PARSONS
STANLEY S. COOK
BY Spear, Middleton, Donaldson & Hall
ATTORNEYS.

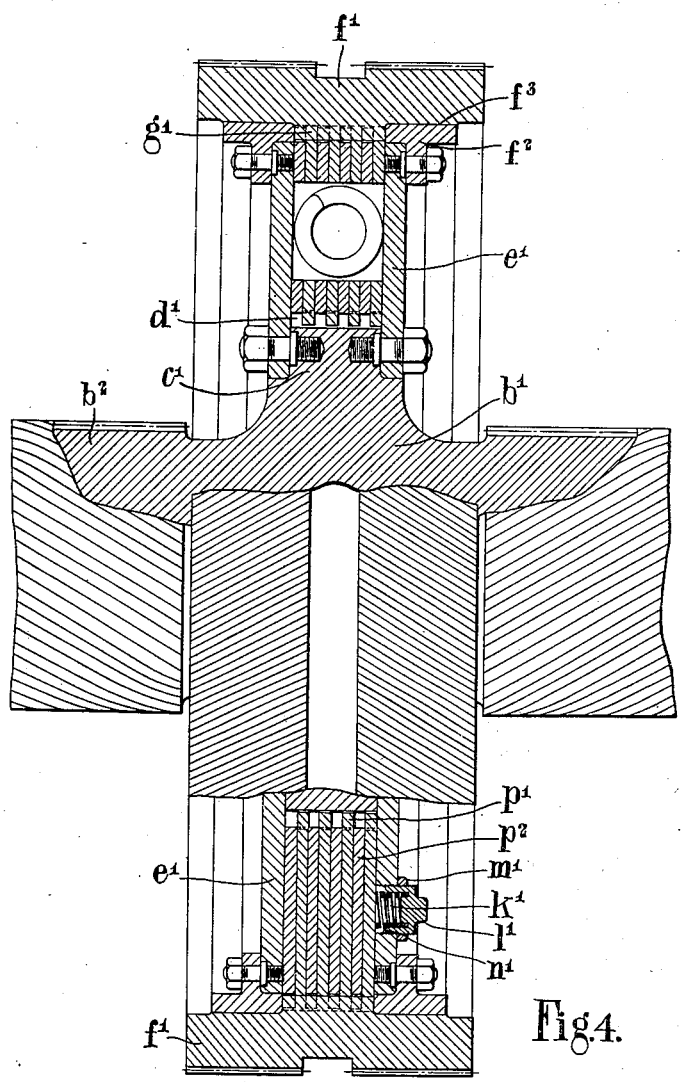

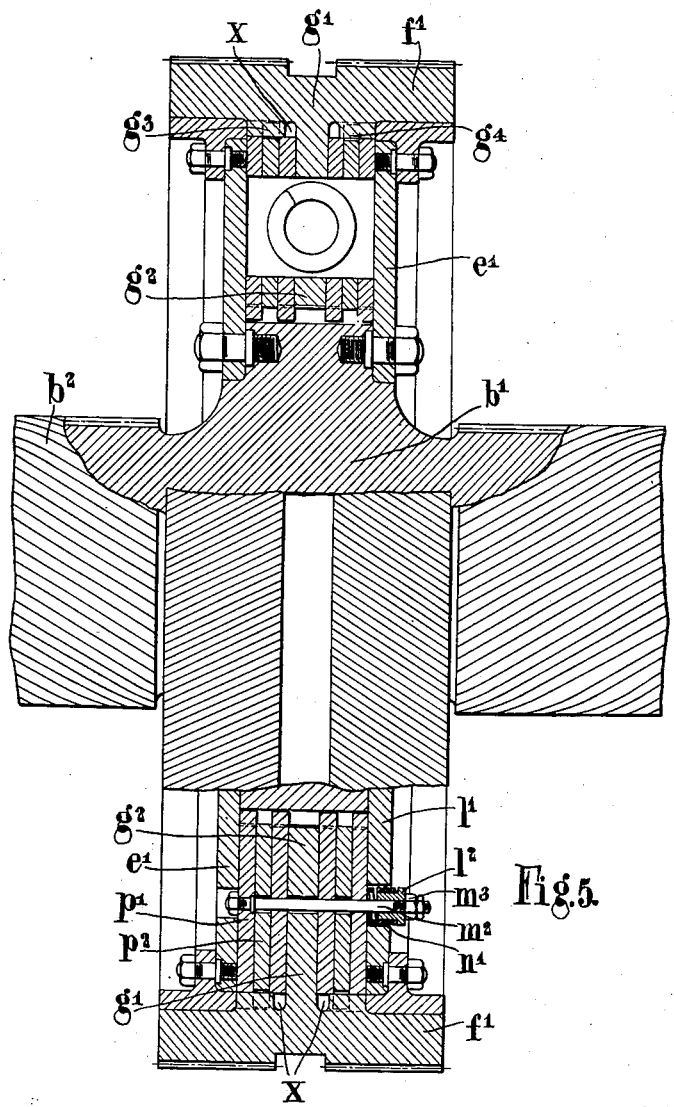

Patented Jan. 16, 1923.

1,442,092

UNITED STATES PATENT OFFICE.

CHARLES ALGERNON PARSONS AND STANLEY SMITH COOK, OF NEWCASTLE-UPON-TYNE, ENGLAND; SAID COOK ASSIGNOR TO SAID PARSONS.

ELASTIC DRIVE.

Application filed May 18, 1922. Serial No. 562,015.

*To all whom it may concern:*

Be it known that we, CHARLES ALGERNON PARSONS and STANLEY SMITH COOK, both subjects of the King of Great Britain and Ireland, and both residing at Heaton Works, Newcastle-upon-Tyne, in the county of Northumberland, England, have invented certain new and useful Improvements in or Relating to Elastic Drives, of which the following is a specification.

The invention relates to improvements in elastic or spring drives for transmitting rotary motion from one member to another of the type provided with some kind of damping device for checking the undue accumulation of torsional or circumferential oscillations.

The main object of the invention is to provide a new form of such a drive, which shall be more compact in construction than those heretofore proposed.

This object is secured essentially according to the present invention by such an arrangement of the components of the complete device that the function of transmitting driving force to and from the spring elements and also the function of damping torsional or circumferential oscillations are performed by the same set of elements instead of by different sets as heretofore.

From a more structural point of view, a preferred form of the invention may be summarized as an elastic or spring drive in which the elastic or spring elements are disposed in recesses formed in a plurality of juxtaposed damping elements secured alternately to the driving and driven members respectively.

In order that the carrying of the invention into effect may be understood, reference will now be made to the accompanying drawings, in which:—

Figure 4 is a sectional elevation and illustrates the application of the invention between two members of a gear train.

Figure 5 is a sectional elevation of a modification of the application of the invention illustrated by Figure 4.

Figure 1:
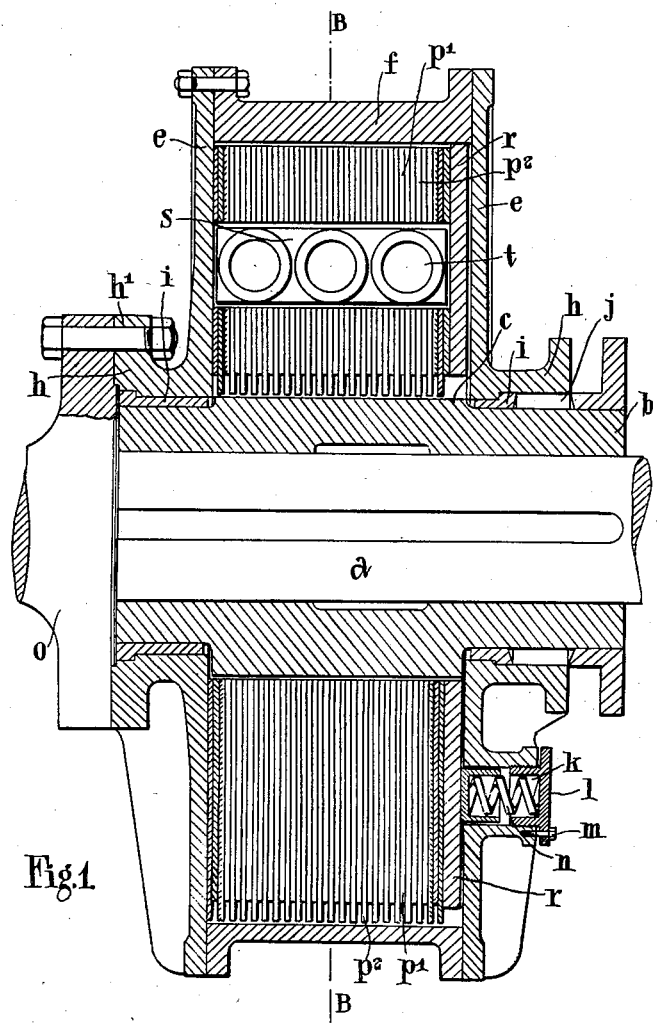
Figure 1 is a sectional elevation of the elastic or spring driving device.
Figure 3:
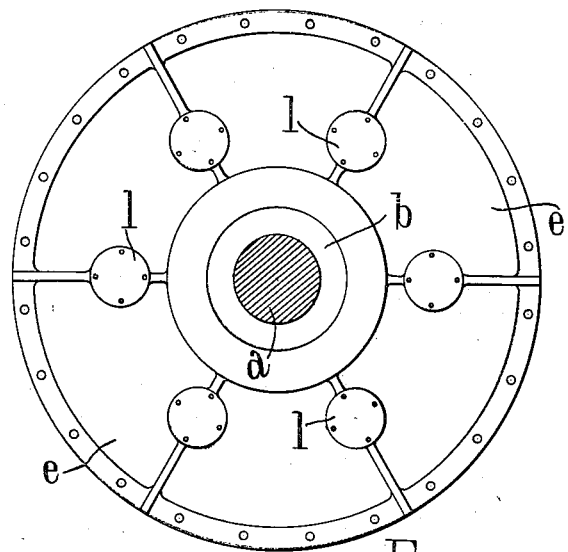
Figure 3 is an end view of the elastic or spring driving device as illustrated in Figures 1 and 2.
Figure 2:
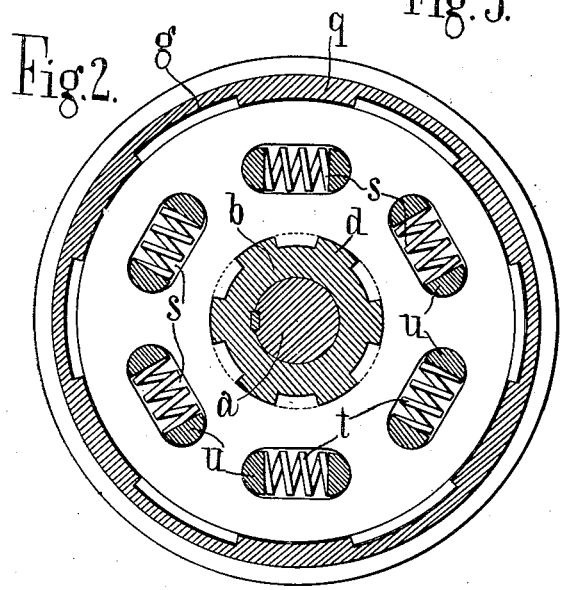
Figure 2 is a sectional end view about the line B—B in Fig. 1.

In carrying the invention into effect in one form by way of example, and as illustrated by Figures 1 to 3 inclusive, the shaft $a$ forming the driving element has secured to it at one end a sleeve or the like $b$, the centre part $c$ of which is of a larger diameter than the ends, and slotted longitudinally so as to leave outstanding a series of castellations or projections $d$. The driven member consists of a casing or box formed of circular end plates $e$ ribbed as required and arranged at right angles to the axis of the shaft $a$ with a cylindrical peripheral portion $f$ slotted longitudinally, as for example at $g$, in a manner analogous to that of the sleeve above mentioned, these parts being bolted or otherwise fastened together in any convenient manner.

The end plates $e$ are mounted on a central boss $h$ which may be lined with anti-friction metal $i$, and bears on the two end portions of the sleeve $b$, a suitable stuffing-box $j$ being preferably arranged to prevent leakage between the boss $h$ and sleeve $b$. On the outside of one of the end plates $e$ forming the box or casing of the driven member, a number of housings $k$ are spaced at equal distances at a suitable radius, each being provided with a cover $l$ and a set screw $m$ passing therethrough, and in each of these housings is arranged a helical spring $n$ with its axis parallel to the axis of the shaft $a$ to bear on the friction discs hereinafter described. If desired the helical spring $n$ may be retained in position in the manner referred to in conjunction with the modifications of the invention hereinafter described. Finally the boss of the casing is provided with a flange $h'$ so that it may be bolted, for example to a second shaft $o$ co-axial with the driving shaft $a$.

Within the casing or box so formed a number of friction discs or plates $p'$, $p^2$, are arranged in such a way that they engage alternately with the projections $d$ on the sleeve $b$ and the projections $q$ on the inside of the cylindrical part of the casing $f$. In the case illustrated blank follower plate $r$ serves to transmit to the first of the discs $p$ the pressure of the helical springs $n$ above mentioned, the last of the discs $p$ being pressed against one of the end plates e of the casing. Each of the friction discs p has the general form of a circular plate with a central circular aperture, those discs p' in driven relation to the driving member a being castellated on their inner periphery to correspond with the sleeve b, and those discs $p^2$ in driving relation to the driven member being similarly shaped on their outer periphery to correspond with the projections q on the inner wall of the cylindrical part f of the casing or box. These discs are in addition formed with a series of holes s passing through them from one side to the other, the holes, which are, for example, of oblong form with semi-circular ends, being spaced around a circle at as great a distance from the centre of rotation as may be convenient with their longer axes running more or less tangentially. In each of the receses formed by the holes s, which should register with one another when no power is being transmitted, a helical spring or springs t is or are inserted, each end of each spring bearing on a semi-cylindrical pad or the like u inserted in the holes s and shaped to correspond therewith.

In carrying the invention into effect in another form and taking by way of example the application of the invention between two members of a gear train, the pinion element or hub portion b' corresponding to the sleeve b in the previous example is mounted on a shaft a in any convenient manner. The centre part c' of the pinion element b' is of larger diameter than the toothed ends $b^2$ and is castellated at d' in the manner already described in conjunction with the preceding example. The outer toothed member f' corresponding to the cylindrical peripheral portion f illustrated in Figure 1 is slotted at its central portion g' in a manner analogous to the central part c' of the pinion element b'. In contradistinction to the construction illustrated by Figures 1 to 3 the end plates e' are detachably fastened to the centre part c' of the pinion element b' and are at their outer extremity detachably fastened to the ring elements $f^2$ which provide a bearing surface $f^3$ for the outer toothed member f'. On the outside of one of the end plates e' a number of housings or holes k' are provided at equal distances at a suitable radius, each being provided with a cover l' which is screwed into the housing and locked therein by means of a locking ring or nut m'. In each of these housings is arranged a helical spring n' with its axis parallel to the axis of the shaft a to bear on the friction discs hereinbefore described and hereinafter referred to in conjunction with the present construction.

As in the previous example, a number of friction discs or plates p', $p^2$ are provided and arranged with their component elements in a manner analogous to that hereinafter described with the exception that the blank follower plate r may or may not be provided.

A modification of the last described method of carrying the invention into effect is illustrated by Figure 5, the essential differences being in the form taken by the central portion g' of the outer toothed member f' and in the arrangement provided for retaining the helical spring n', which in the previous example was accommodated within a housing. When studying Figure 5 of the drawings it will be observed that the outer toothed member f' is provided with a central inwardly projecting flange or web $g^2$, which extends to the outer portion of the castellations forming a part of the pinion element or hub portion b'. The member f' is castellated at $g^3$ and $g^4$ for the purpose hereinbefore described. The extension $g^2$ is not castellated but is free to move over castellations formed on the central portion of the pinion element b'. The spring n' is accommodated within an aperture cut in one of the end plates e' and is retained in position by means of a pad piece $l^2$ through the centre of which passes a bolt or tension element $m^2$. The bolt is retained in position by nuts $m^3$ and is at one end detachably fastened to friction disc p' co-operating with the castellations on the pinion element b'. The friction discs or plates $p^2$, co-operating with the castellations on the central portion of the outer toothed member, are suitably slotted for the passage of the bolt or tension element $m^2$, the slots being elongated circumferentially to correspond with the motion of the springs.

In the modified forms of the invention illustrated in Figures 4 and 5, if desired the helical spring n' may be retained in position in the manner referred to in conjunction with the modifications of the invention described.

It will be seen that with the arrangement described, any angular movement of the driven element in relation to the driving element will cause the springs s to be compressed no matter which may be the direction of rotation, the driving forces being transmitted from the driving element a to the springs t by way of the friction discs p' secured to the sleeve and thence from the springs to the friction discs $p^2$ secured to the driven element. The discs p', $p^2$, thus serve the double purpose of providing the necessary frictional damping to prevent undesirable stresses due to synchronous torsional or circumferential oscillations, and also of transmitting the driving forces to and from the springs.

It will be understood that a certain amount of the total power will be transmitted frictionally from one set of discs to the other without stressing the springs s.

Obviously the functions of the driving and driven elements may be interchanged.

Although one specific form of the invention has been described in considerable detail, it will be seen that the different elements constituting the whole may take a variety of forms without departing from the spirit of the invention.

Thus, instead of a number of separate springs acting to press the friction discs together, a single helical spring with its convolutions encircling the shaft and enclosed in an annular housing attached to the casing or box may be adopted, while in addition the elastic driving elements may be of any material and shape having the characteristics necessary for carrying out their functions.

Having now described our invention what we claim as new and desire to secure by Letters Patent is:—

1. An elastic or spring drive having in combination a driving and a driven member, damping elements respectively in operative relation with said driving and driven members, and spring elements transmitting power between said respective damping elements.

2. An elastic or spring drive having in combination a driving and a driven member, frictional damping elements respectively in operative relation with said driving and driven members, and spring elements transmitting power between said respective damping elements.

3. An elastic or spring drive having in combination a driving and a driven member, damping elements having apertures therein respectively in operative relation with said driving and driven members, and spring elements disposed in said apertures transmitting power between said respective damping elements.

4. An elastic or spring drive having in combination a castellated driving and a castellated driven member, castellated damping elements respectively in operative relation with said driving and driven members, and spring elements transmitting power between said respective damping elements.

5. An elastic or spring drive having in combination a driving and a driven member, damping elements respectively in operative relation with said driving and driven members, and spring elements transmitting power between said respective damping elements, one of said members having a toothed rim and the other an independently movable hub-portion.

In testimony whereof we have signed our names to this specification.

CHARLES ALGERNON PARSONS.
STANLEY SMITH COOK.